March 26, 1940.　　　J. DOLZA　　　2,195,270
TRANSMISSION REMOTE CONTROL
Filed July 22, 1938
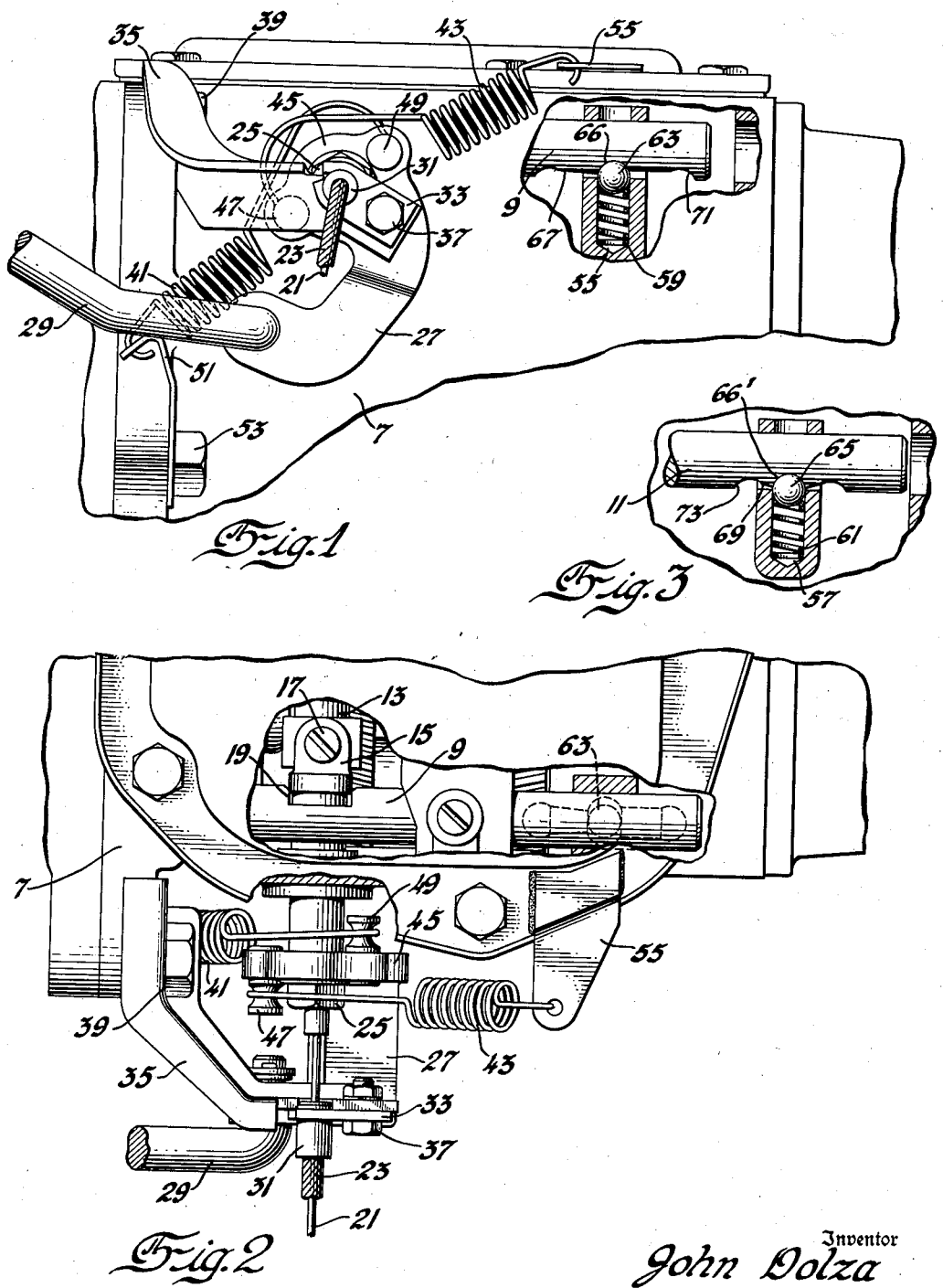
Inventor
John Dolza
By Blackmore, Spencer & Hink
Attorneys Patented Mar. 26, 1940

2,195,270

UNITED STATES PATENT OFFICE 2,195,270

TRANSMISSION REMOTE CONTROL

John Dolza, Flint, Mich., assignor to General Motors Corporation, Detroit, Mich., a corporation of Delaware Application July 22, 1938, Serial No. 220,650

2 Claims. (Cl. 74—473)

This invention relates to change speed mechanism and has been developed more particularly for use with motor vehicles wherein provision is made for changing the driving ratio between the input shaft and the output shaft of the transmission. It has been designed particularly to assist the operator in making ratio changes in those installations where the manually operable means for shifting is located in some position remote from the gear shift housing as, for example, where a manually operable lever for shifting is mounted on the steering column adjacent the steering wheel.

The object of the invention is to provide resilient means for assisting the operator in making a change in driving ratio and is so mounted that its energy is available for making the several shifts from a neutral position to any one of the driving positions.

Other incidental objects will be understood from the following descriptions:

In the drawing:

Figure 1 is a view in elevation partly broken away and parts shown in section.

Figure 2 is a top plan view also partly broken away.

Figure 3 is a detail of a part of the high speed shift rail.

The transmission housing of a motor vehicle is indicated by numeral 7. The clutches and gears by which ratio changes are made are only partially shown and are not designated by reference characters for the reason that such elements are not a part of this invention. The transmission makes use of longitudinally movable shift rails, such rails being designated by numerals 9 and 11. Shift rail 9 is reciprocable for shifting gears to establish low speed driving ratio and a reverse drive. Shift rail 11 is intended to be moved from a central neutral position in both directions for establishing drives in second speed and high speed.

A selector shaft 13 is mounted for reciprocation and extends transversely of rails 9 and 11. It carries arms, one of which is shown at 15 secured to the shaft by fastening means 17. These arms are adapted to be received in recesses of the shift rails. Figure 2 shows one such arm 15 within a recess 19 of rail 9. It will be understood that the engagement of these arms in the recesses of the rails is selective and after one such engagement, rotation of shaft 13 serves to reciprocate the selected rail.

Reciprocation of the selector shaft for engagement with one or the other of the rails is effected by a flexible cable 21 reciprocable in a flexible housing 23. The cable extends through a nut 25 on the end of shaft 13 and into a recess (not shown), within the end of the shaft, within which recess it carries suitable means to prevent the escape of its end through the nut after the parts are assembled. By this means the cable may reciprocate shaft 13 to operably engage either rail and at the same time not interfere with the rotation of the shaft. The shaft rotation is effected by means of a lever arm 27 carried by the end of the shaft and rocked by a link 29. The end of the cable housing 23 is carried by a tip 31 supported by a retainer 33 attached to a bracket 35 by fastening means 37, the bracket being itself secured to the transmission housing by fastening means 39.

It is intended that the cable 21 and the link 29 shall be reciprocated from a remote position, the reciprocation of the cable causing a reciprocation of shaft 13 to select one or the other of the rails and the reciprocation of link 29 serving to rotate shaft 13 which rotation reciprocates the selected rail. The force to reciprocate the rail and the cable is preferably manually applied and may originate with a lever mounted adjacent the top of the steering column. Such a lever for such a purpose has been so located in prior constructions. The lever may reciprocate a shaft mounted alongside the steering column which shaft is operably connected to the cable so that reciprocation of the cable may be effected to make the driving ratio selections. Rotation of the hand lever is used to rotate the shaft alongside the steering column which rotation operates through a connected lever arm and the link 29 to rotate shaft 13 and reciprocate one or the other of the shift rails. It is deemed unnecessary to show the parts by which the members 21 and 29 are moved and the above description is to be understood as merely explaining a known way in which such parts may be operated.

To assist in effecting the rocking of shaft 13 from its neutral to its active positions there is employed a servo mechanism which takes the form of a pair of coil springs 41 and 43. A crosshead 45 is carried by shaft 13. To the ends of the crosshead are secured spool-like studs 47 and 49. Spring 41 has one end attached to a plate 51 secured to the housing at 53. Spring 43 has one end anchored to a similar plate 5 which may be welded to the top of the transmission housing. The adjacent ends of the springs have integral extensions bent around the axis of shaft 13 and are engaged with the opposite studs as shown.

Figure 1 shows the parts in the positions they assume when the transmission is in a neutral position. The axes of the springs are then substantially parallel, both springs are in tension, and in each case the line joining the ends of the spring passes through the axis of shaft 13 whereby the potential spring energy is ineffective to rotate the shaft. When the shaft 13 is rocked by manual effort remotely applied, the rotation of the crosshead releases the spring energy in the case of each spring so that it supplements the manual effort and completes the rotation of the selector shaft 13 and the reciprocation of the selected rail to an active position. Obviously the restoration to the neutral position is accomplished manually against the progressive resistance of the two springs 41 and 43 until the neutral position is reached.

As is usual in such devices, spring detents are used with the two rails. In suitable recesses 55 and 57 in the housing are springs 59 and 61 which press balls 63 and 65 outwardly. Each shift rail is provided with a channel having recesses to receive the ball projected by the spring. In the case of each channel there is a relatively deep central recess 66 and 66'. Its depth insures a retention of the rail in its neutral position. When shaft 13 is manually rotated the ball, 63 or 65, is lifted from the central recess to one or another of the sloping surfaces 67 or 69 as the case may be. At this time the energy of springs 41 and 43 is released and the springs supplement the manually applied effort in effecting the shifting of the selective rail to an active driving position. It will be observed that the sloping surfaces 71 and 73 at the ends of each channel resist the shifting action of the pair of springs and cushion the movement of the rail as it reaches its ultimate position. It should be noticed that these surfaces 71 and 73 have a gradual inclination. This is preferred to surfaces having sharply inclined walls for the reason that the latter formation would cause a sudden and noisy stop as the rail reached its end position. It will also be observed from the drawing that the length of the channel in rail 9 is greater than the length of the channel in rail 11. This will be understood if it be explained that the transmission with which this mechanism is used employs sliding gears for low speed and reverse whereas high speed and second speed make use of clutch teeth, the gear teeth requiring a longer movement than the clutch teeth. It may also be said that there is no occasion for a steep sloping wall on the inner side of the end recesses for the reason that the springs 41 and 43 are constantly acting to hold the rails in their active positions. Not only does the spring detent device serve to hold the parts in the selected active position but the springs 41 and 43 act as if the operator of a conventionally operated transmission were continuously holding the shift lever in the selected driving position.

I claim:

1. In change speed transmission, a member to establish driving ratios movable from a neutral mean position to extreme active positions, manually operated mechanical means to move said member, yielding servo means acting in parallel with said mechanical means and potentially energized in the neutral position of said member, said energy being released by the movement of said member from said mean position by said mechanical means, said member having a channel formed with a relatively deep intermediate recess and relatively shallow end recesses formed with sloping end walls and a spring pressed detent to engage said recesses.

2. In change speed transmission, a member to establish driving ratios movable from a neutral mean position to extreme active positions, manually operated mechanical means to move said member, yielding servo means acting in parallel with said mechanical means and potentially energized in the neutral position of said member, said energy being released by the movement of said member from said mean position by said mechanical means, said mechanical means comprising a shaft extending at right angles to said member, an arm on said shaft, means to reciprocate said shaft to effect the engagement of its arm with said member, said shaft being rotatably supported whereby it may rotate and move said member together with an external arm on said shaft whereby it may be rotated.

JOHN DOLZA.